ically large. The inverter therefore continues to supply the fan motor.

United States Patent Office 3,623,434
Patented Nov. 30, 1971

3,623,434
LINEAR MOTOR PROPELLED AIR CUSHION VEHICLE
Edward Alfred Keith Jarvis, Hale, England, assignor to Tracked Hovercraft Limited, London, England
Filed Oct. 15, 1969, Ser. No. 866,581
Int. Cl. B60l 9/18, 13/00
U.S. Cl. 104—148 LM                                4 Claims

ABSTRACT OF THE DISCLOSURE

A track guided air cushion vehicle is propelled by a linear induction motor. D.C. is supplied along the track, and the air cushion devices are supplied with air from D.C. operated fan motors. An inverter converts the D.C. main supply to A.C. for the linear motor. If the main D.C. supply fails, the linear motor is arranged to regenerate A.C. which is rectified by rectifiers in the inverter so as to supply D.C. to the fan motor.

---

Figure 1:
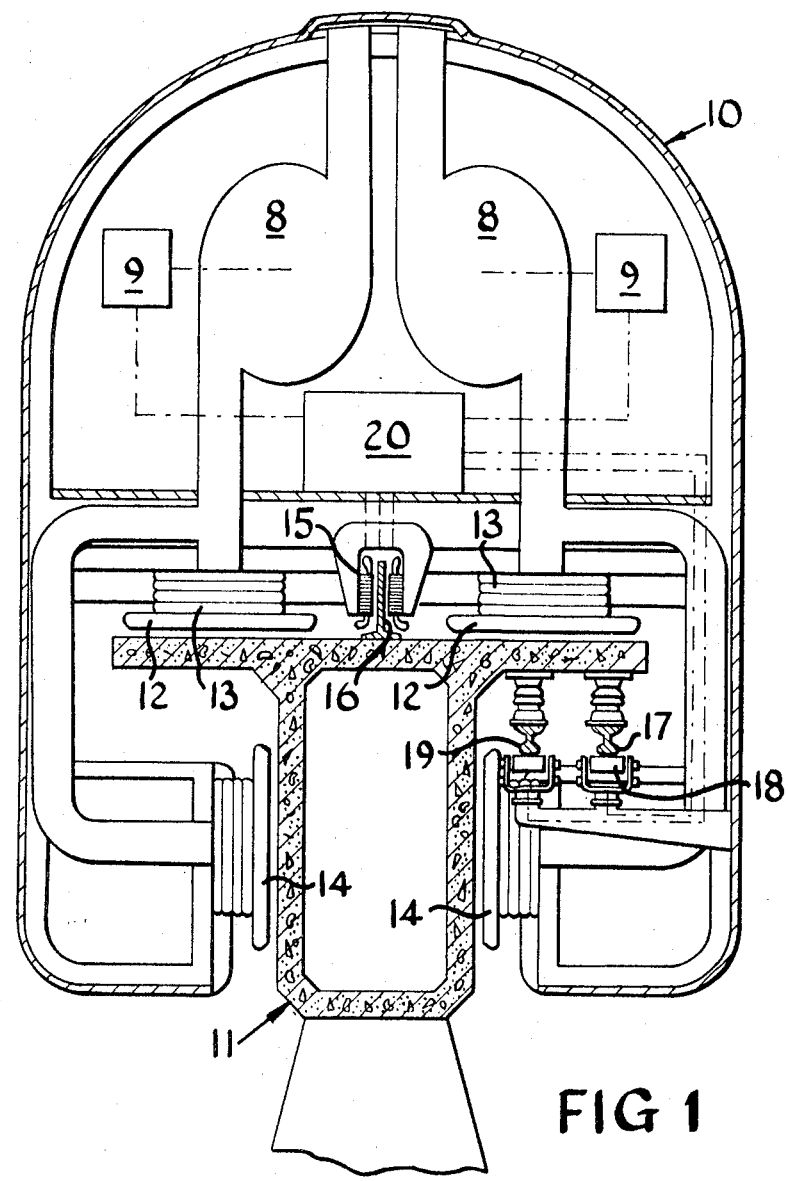

This invention relates to a track guided air cushion vehicle which is propelled by a linear induction motor.

In U.S. patent specification 3,361,081 there is proposed an arrangement whereby, in the case of failure of the main power supply, the air cushion fans are supplied with current by running the linear motor as a regenerative brake, so that the vehicle is simultaneously supported out of contact with the track, and braked.

According to the present invention a track guided vehicle includes at least one air cushion device for at least partially supporting the vehicle, a linear induction motor stator for co-operating with a reaction rail extending along the track to propel the vehicle, at least one direct current operated fan motor for supplying pressurized air for the air cushion device, and an inverter for converting main power supply of direct current to alternating current for the linear motor stator, in which the linear motor stator, the fan motor and the inverter, are so arranged that if the main power supply fails the stator reacting with the reaction rail will regenerate alternating current which will be rectified by rectifiers in the inverter circuit so as to supply direct current to the fan motor.

The present invention overcomes problems that arise when a D.C. fan motor is used to supply the air cushion device. These problems are that the linear motor when regenerating current cannot by itself supply the direct current needed by the fan motor, and that a linear motor will not regenerate unless excited with reactive volt-amperes.

It is necessary for the reactive volt-ampere requirement of the linear motor to be provided immediately after the main supply has failed to enable the linear motor to began to regenerate. It has been found that the required volt amperes can indeed be provided despite the failure of the main supply in an arrangement according to the invention and this is provided by either stored energy in the inverter, or by the electromotive force generated by the fan motor which is still turning at the moment of failure and which is applied to the linear motor via the inverter. A combination of both these phenomena may also provide the required reactive volt-amperes.

Thus in one possible embodiment of the invention the fan motor is so arranged that if the main supply fails the momentum of the fan motor will cause it to act temporarily as a direct current generator so as to supply energy to the inverter which will thus provide initial excitation for the linear motor stator reacting with the reaction rail to regenerate. As soon as the linear motor starts to regenerate and to supply alternating current to the inverter, the inverter will supply direct current to the fan motor which will therefore continue to supply pressurized air to the cushion.

The fan motor could be self exciting when it is acting as a generator, or a source of direct current, for example a battery, may be provided and arranged to excite the fan motor if the main supply fails so that the fan motor acts as a generator.

Figure 2:
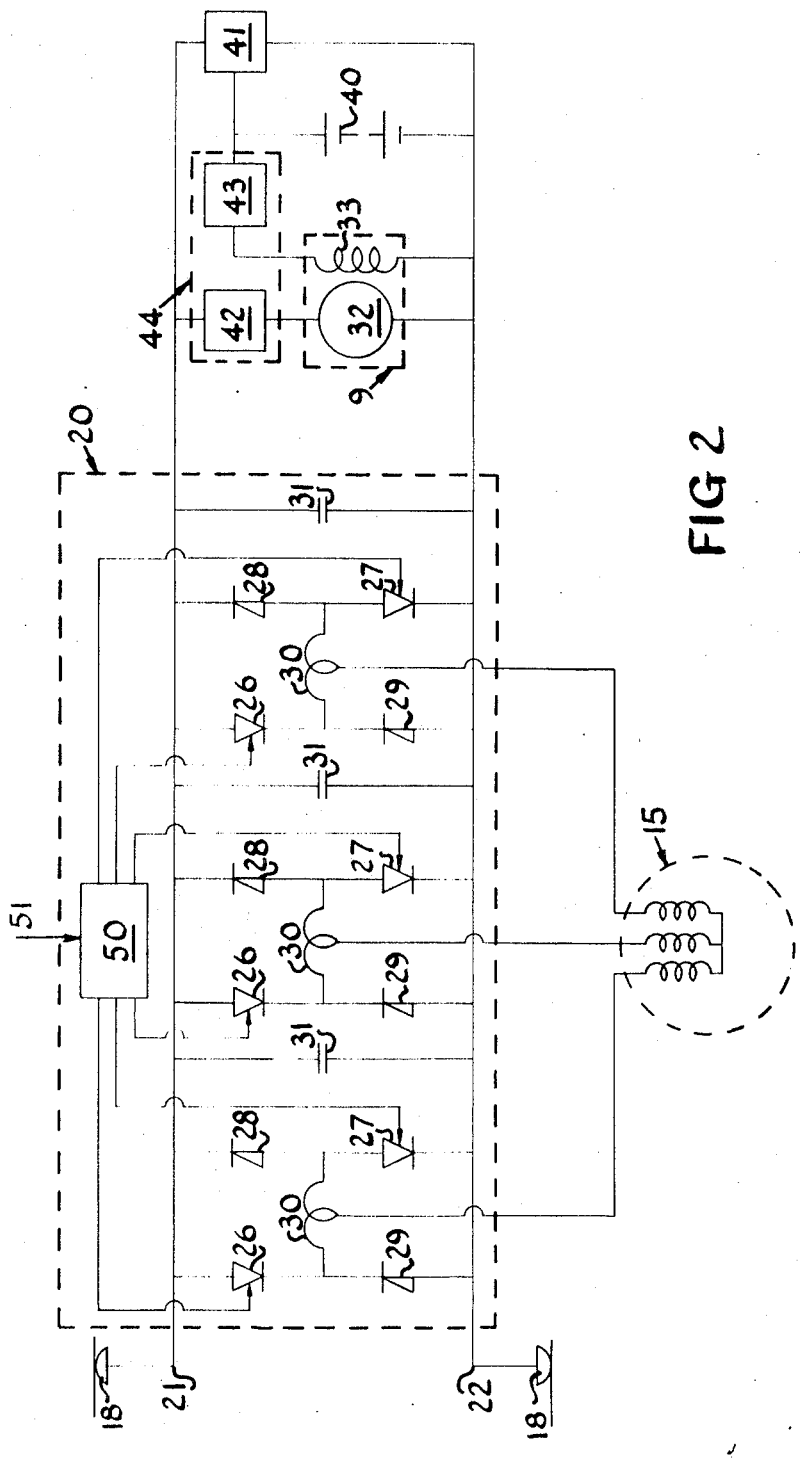

A preferred embodiment of the invention will now be described with reference to the accompanying drawings in which:

FIG. 1 is a cross section through a linear motor propelled tracked air cushion vehicle mounted on its track, and FIG. 2 is a simplified circuit diagram of the electrical system, leaving out items not essential to the understanding of the invention.

The track guided air cushion vehicle in FIG. 1 includes a body 10 supported over a prepared concrete track 11 on air cushion devices 12 supplied with air via ducts 13. Lateral stability is provided for by guidance air cushion devices 14 and the vehicle is driven by a linear induction motor having a stator 15 of the double sided type connected to the vehicle and straddling an aluminium reaction rail or rotor 16. Direct current is supplied via a conductor rail 17 attached to the track 11, the current being collected through collector shoes 18 and returned through similar shoes in contact with the return rail 19.

The air is supplied to the cushion devices 12 and 14 by means of an appropriate number of fans 8, each of the fans 8 being driven by a direct current motor 9. A thyristor inverter 20 is carried on board the vehicle 10 for converting the main power supply of direct current collected by the vehicle to an alternating current supply for the linear motor stator 15.

In FIG. 2 the linear motor stator 15 is represented in the conventional way electrically. The D.C. supply collected by the shoes 18 is applied between the positive and the negative terminals 21 and 22 respectively.

There are three conventionally arranged sets of thyristors and diodes forming the basic elements of the three phase inverter 20. Each set of thyristors and diodes is shown in simplified form as a pair of thyristors 26 and 27, a pair of diodes 28 and 29 arranged as shown in relation to an inductance 30, and storage capacitors 31 connected across the D.C. terminals 21, 22. These items are well known components of a forced commutation inverter supplied from a D.C. source. The D.C. supply across terminals 21 and 22 is converted by the inverter 20 to three phase variable frequency A.C. which is applied to the linear induction motor stator 15.

The fan motors 9 have armatures 32 and field windings 33, both of which are connected to the D.C. supply via a control unit 44 whose function is to sense and adjust, if necessary, the speed of the motors 9. The field windings 33 of the fan motors 9 are supplied with current via a field current controlling device 43 within the control unit 44 from a high to low tension converter 41. In non-emergency operation, the armatures 32 of the fan motors 9 are connected across the D.C. supply through an armature current controlling device 42 within the control unit 44. A battery 40 is also connected in circuit as indicated.

The remaining circuitry including power switches, protection relays etc., is not shown but may be quite conventional.

In the event of failure of the track power supply when the vehicle is at speed, the fan motors 9 will still be turning at the instant of failure due to the momentum of the motors and they will act temporarily as D.C. generators, at about the track supply voltage. The unit 43 maintains the voltage output of the fan motors 9 (instantaneously now working as generators) at an appropriate value. This will provide, in combination with the storage capacitors 31 of the inverter 20, the initial reactive volt-amperes required for the linear motor excitation so that the motor will then regenerate A.C. under the vehicle momentum. This A.C. is rectified by diodes 28 and 29 thus re-establishing a D.C. supply across terminals 21 and 22, maintained now by the energy generated in the linear motor. This restores the power supply to the fan motors 9 and ensures their satisfactory operation until the regenerated energy from the linear motor becomes too low to provide adequate lift and guidance pressure from the fans because of the falling speed of the vehicle.

The battery 40, which under normal conditions floats across the excitation supply to the fan motors 9, is available to provide the excitation needed for the fan motors when, immediately after a failure of the main power supply, they regeneratively act temporarily to maintain a D.C. voltage across the inverter as previously described.

For the linear motor to regenerate it is known that it must have a synchronous speed lower than the actual speed of the vehicle. The firing circuit within the inverter unit 20 for the thryistors 26 and 27 comprises the control device 50 which receives a vehicle speed input signal 51 and automatically adjusts the inverter relative to the vehicle speed to obtain the desired braking thrust.

Thus according to the invention it is possible to maintain the lift fans at an adequate speed until the vehicle has slowed down sufficiently to make it safe for the vehicle to come to rest on the track, probably with the aid of emergency skids or wheels. Clearly it is important to maintain the lift fans operating for as long a time as possible in the event of power failure because otherwise the vehicle would drop sharply on to the track at high speed which could be disastrous.

In another arrangement according to the invention the fan motors 9 need not act instantaneously as generators at the moment of failure of the main power supply. Instead the linear motor stator 15 draws the required reactive volt amperes from the storage capacitors 31, which form part of the inverter unit 20. At the moment of failure the storage capacitors 31 will be sufficiently charged so that the inverter 20 itself provides the reactive volt amperes for the linear motor to begin to regenerate alternating current.

I claim:

1. A track guided air cushion vehicle adapted for operation along a prepared track having air cushion means for generating and maintaining at least one cushion of pressurised air at least partly spacing the vehicle from the track, a source of D.C. electric supply, D.C. motor means having input terminals connected to the D.C. power supply and arranged for providing motive power to the air cushion means, and a linear induction motor stator for propelling the vehicle along the track by co-operation with a linear induction motor reaction rail extending along the track, wherein the improvement comprises a static inverter having input terminals connected to the DC. power supply and its output connected to the linear induction motor stator for supplying A.C. electric power thereto, the inverter comprising a plurality of first rectifiers each controllable to conduction in response to an input gating signal thereto, commutation means arranged for changing each rectifier from its conductive to its nonconductive state at an appropriate moment of time, and circuits including second rectifiers so connected as to provide a path allowing a continued motor current flow instead of each said first rectifier when non-conductive, control means for providing the said input gating signals to the first rectifiers, and means capable of temporarily maintaining a D.C. voltage across the input terminals of the inverter in the event of a failure of the D.C. supply means, said control means being arranged, on receipt of a signal indicative of such an event when the vehicle is travelling along the track, to control the synchronous speed of the linear induction motor to a value which is below the actual vehicle speed, whereby the linear induction motor stator is caused regeneratively to supply cushion-sustaining D.C. power to the D.C. motor means via the said second rectifiers.

2. A vehicle according to claim 1, wherein the means capable of temporarily maintaining a D.C. voltage across the input terminals of the inverter is at least in part comprised of at least one capacitor.

3. A vehicle according to claim 1, wherein the means capable of temporarily maintaining a D.C. voltage across the input terminals of the inverter is at least in part comprised of the said D.C. motor means which, subsequent to the failure of the D.C. supply means, acts regeneratively until such time as it receives the regenerative D.C. power from the linear induction motor via the inverter.

4. A vehicle according to claim 1, wherein the D.C. motor means comprises a D.C. motor having a separately excited field winding, the vehicle including a battery connected to said field winding for maintaining the excitation voltage at substantially a predetermined value.

References Cited
UNITED STATES PATENTS

| | | | |
|---|---|---|---|
| 3,354,370 | 11/1967 | Corry et al. | 318—227 |
| 3,361,081 | 1/1968 | Bliss | 104—148 |
| 3,384,804 | 5/1968 | Salihi | 318—227 |

DRAYTON E. HOFFMAN, Primary Examiner

U.S. Cl. X.R.

104—23 FS; 310—13; 318—227

PO-1050
(5/69)

UNITED STATES PATENT OFFICE
CERTIFICATE OF CORRECTION

Patent No. 3,623,434      Dated November 30, 1971

Inventor(s) Edward Alfred Keith Jarvis

It is certified that error appears in the above-identified patent and that said Letters Patent are hereby corrected as shown below:

Column 1, in the heading following "Filed Oct. 15, 1969, Ser. No. 866,581" insert --Claims priority, application Great Britain, Oct. 16, 1968, No. 49,017/68--; line 56, "began" should read --begin--.

Signed and sealed this 6th day of June 1972.

(SEAL)
Attest:

EDWARD M. FLETCHER, JR.      ROBERT GOTTSCHALK
Attesting Officer      Commissioner of Patents